(12) United States Patent  
De Godzinsky

(10) Patent No.: US 8,279,315 B2
(45) Date of Patent: Oct. 2, 2012

(54) CCD SENSOR AND METHOD FOR EXPANDING DYNAMIC RANGE OF CCD SENSOR

(75) Inventor: Christian De Godzinsky, Vantaa (FI)

(73) Assignee: Planmeca Oy, Helsinki (FI)

(*) Notice: Subject to any disclaimer, the term of this patent is extended or adjusted under 35 U.S.C. 154(b) by 914 days.

(21) Appl. No.: 11/871,581

(22) Filed: Oct. 12, 2007

(65) Prior Publication Data

US 2008/0036893 A1 Feb. 14, 2008

Related U.S. Application Data

(63) Continuation-in-part of application No. PCT/FI2006/050151, filed on Apr. 12, 2006, and a continuation-in-part of application No. PCT/FI2006/050152, filed on Apr. 12, 2006.

(30) Foreign Application Priority Data

Apr. 12, 2005 (FI) .................................. 20050374
Apr. 12, 2005 (FI) .................................. 20050375

(51) Int. Cl.
*H04N 5/335* (2011.01)
(52) U.S. Cl. ...................................................... 348/311
(58) Field of Classification Search .................. None
See application file for complete search history.

(56) References Cited

U.S. PATENT DOCUMENTS

| 4,993,053 | A | 2/1991 | Itoh et al. |
| 5,432,335 | A | 7/1995 | West et al. |
| 5,773,832 | A * | 6/1998 | Sayed et al. ............. 250/370.09 |
| 5,848,123 | A | 12/1998 | Strommer |
| 5,867,215 | A | 2/1999 | Kaplan |
| 5,949,483 | A | 9/1999 | Fossum et al. |
| 6,028,299 | A | 2/2000 | Hirama et al. |
| 6,410,905 | B1 | 6/2002 | Heidtmann et al. |
| 6,784,926 | B1 | 8/2004 | Korpi et al. |
| 6,800,870 | B2 | 10/2004 | Sayag |
| 7,015,963 | B2 * | 3/2006 | Ebi .............................. 348/294 |
| 7,145,985 | B2 * | 12/2006 | Strommer ................... 378/98.8 |

(Continued)

FOREIGN PATENT DOCUMENTS

| CA | 2295893 | 5/1999 |
| EP | 0559155 A1 | 9/1993 |
| EP | 0776124 | 5/1997 |

(Continued)

OTHER PUBLICATIONS

Supplementary European Search Report for application No. EP 06725926 dated Sep. 11, 2009, 1 page.

*Primary Examiner* — Luong T Nguyen
(74) *Attorney, Agent, or Firm* — Cozen O'Connor

(57) ABSTRACT

A read-out arrangement for reading a CCD-sensor (1-1), detector (1-2) which has an active area including pixels that receives charges and a read-out register (1-4) in functional connection with the active area. Charges are transferred from the active area into a read-out register (1-4) and to at least one read-out well (106, 108) arranged in connection with at least output (1-4a1-4b) of the read-out register (1-4). The dynamics of the CCD-sensor can be changed by changing binning of the charges at least partly in response to a control signal.

28 Claims, 4 Drawing Sheets

U.S. PATENT DOCUMENTS

| | | | |
|---|---|---|---|
| 7,522,205 B2 * | 4/2009 | Parks | 348/311 |
| 2002/0126213 A1 | 9/2002 | Hynecek | |
| 2003/0035057 A1 * | 2/2003 | Hakamata et al. | 348/311 |
| 2005/0001914 A1 * | 1/2005 | Kueny | 348/294 |
| 2005/0012968 A1 | 1/2005 | McCaffrey | |

FOREIGN PATENT DOCUMENTS

| | | |
|---|---|---|
| EP | 1278060 A1 | 1/2003 |
| JP | 07050409 | 2/1995 |
| JP | 08298626 | 12/1996 |
| JP | 2002-135657 A | 5/2002 |

* cited by examiner

| | |
|---|---|
| Capacity of one pixel (33 μm x 33 μm) | 1.000.000 electrons |
| Capacity of read-out register | 3.000.000 electrons |
| Capacity of output amplifier A | 2.400.000 electrons |
| Capacity of output amplifier B | 4.800.000 electrons |

CCD SENSOR AND METHOD FOR EXPANDING DYNAMIC RANGE OF CCD SENSOR

CROSS-REFERENCE TO RELATED APPLICATIONS

This application is continuation-in-part of PCT applications PCT/FI2006/050151 and PCT/FI2006/050152, both of which are incorporated herein by reference.

FIELD OF THE INVENTION

The present invention relates to a CCD sensor and to a read out arrangement according to the preambles of claims 1 and 13. In addition, the invention relates to methods for expanding the dynamics of a CCD sensor according to the preambles of claims 16, 23 and 24.

BACKGROUND OF THE INVENTION

A CCD device (Charge Coupled Device) can be defined as being a semiconductor device wherein, due to the movement of electric charges, storage and collection of charges is possible. These charge transfer devices are used in dynamic, variable storage elements, which characteristically have a high information density. In CCD sensors intended for X-ray imaging, the charges used for image generation, which are formed on physical pixels, can be combined, binned. Binning in a CCD sensor produces virtually larger image pixels. However, in certain situations, handling the charge of these combined pixels may be problematic. Especially at higher signal levels, the signal coming from the image area may be so large that, with the selected binning, the charges can not be combined within the CCD sensor without a risk of saturation of the output amplifier. This can be partially taken into account by designing the read-out register and the charge well of the output amplifier so that they have charge capacities higher than the charge capacity of the pixels. However, if the charge well of the output amplifier is enlarged too much, then the voltage generated on it is reduced, and thus the signal to be produced is also reduced.

At present, the resolution of digital imaging already approaches the level of film-based systems and may in some cases even exceed it. However, it is known that the dynamic range of CCD sensors, the ratio of the maximum signal to the open-circuit noise, to the basic sensitivity, is smaller than the dynamic range of traditional film-based systems. In this context, sensitivity may refer to resolution within background noise, in other words, to the signal size that can be resolved from background noise.

A typical non-cooled CCD device working in MPP mode has a dynamic range of about 10.000:1 ... 20.000:1. The figure giving the dynamic range represents the ratio of saturation voltage to RMS noise. If this dynamic range is effectively utilized, then it will be possible to exploit as many greyness levels as the A/D conversion used allows. For example, in the case of 14 bits, the total number of greyness levels available will be 16.384.

However, these numeric values are not mutually comparable when film-based and digital systems are compared to each other. Even if a film system would utilize only a small proportion of the total dynamics, in practice there would still be a very large number of greyness levels available. If one considers e.g. one thousandth (1:1000) of the dynamics of the film, it can be shown that this range is divided into more than 16 separate levels.

Moreover, CCD based sensors do not forgive in situations of overexposure as do film-based systems, in which the reciprocal law (gradual saturation, s-curve of the film) causes a soft saturation and along with this a "compression", i.e. an expansion of dynamics. It is thus conceivable that one is dealing here with an in-built non-linearity, which can also be understood as a kind of gamma correction in the film itself. In digital sensors, a visible boundary, artefact, is produced as soon as the maximum point of the dynamic range is reached.

The signal amplifier and A/D converter (A/D, Analog-to-Digital) connected after the sensor are designed with an aim to enable the entire dynamic range produced by the CCD sensor to be utilized. As mentioned above, existing CCD sensors can produce a dynamic range even exceeding 20000:1. In an ideal situation, the quantization step of the A/D converter is slightly below the CCD sensor's own noise level. However, this would mean that, in order to digitize the image, it would be necessary to use fast A/D conversion exceeding 14 bits.

In other words, the charge received and contained in a pixel may be so large that it can not be handled in a binning situation in the read-out register and/or in the charge well of the output amplifier without a risk of saturation. Especially in the case of larger binning operations, for example 3×3 and 4×4 (horizontal direction×vertical direction, the number of times of reading from the image area to the output register and from the output register to the read-out well), this becomes a problem. The image formed in the image area is not saturated and it is perfectly usable, but it can not be read out without saturation with the binning in question.

Both in cephalostatic use (Ceph) and in the panoramic image (Pan), there are areas below the jaws, which receive direct radiation without any intermediate tissue attenuating the radiation. In these situations, among others, there is an obvious risk of saturation if the system is otherwise tuned for optimal reception of the signal coming through the object. This makes imaging of e.g. soft tissue areas impossible, and in the areas of saturation all the image information is lost.

BRIEF DESCRIPTION OF THE INVENTION

Thus, the object of the invention is to develop a method and an apparatus implementing the method so as to allow the above problems to be solved. The object of the invention is accomplished by a method and system characterized by what is stated in the independent claims. Preferred embodiments of the invention are disclosed in the dependent claims.

The invention is based on changing binning and/or output well capacity dynamically during sensor read-out.

The method and system of the invention have the advantage of making it possible to expand the dynamic range of the CCD sensor and thus to prevent the sensor or a part of it from getting saturated.

BRIEF DESCRIPTION OF THE FIGURES

In the following, the invention will be described in detail with reference to preferred embodiments and the attached drawings, wherein.

DETAILED DESCRIPTION OF THE INVENTION

In the following, the invention and its preferred embodiments will be described by way of example with reference to a typical CCD sensor (manufactured e.g. by Atmel, Thomson) and charge capacity specifications optimized by also considering an automatic gain control function (AGC, Automatic Gain Control). The sensor may have e.g. the following properties:

Saturation charge of a separate single pixel (size: 33 μm×33 μm): 600.000 electrons.

Saturation charge of read-out register:
  a. 1.800.000 electrons.

Saturation charge of output amplifier A:
  a. 2.400.000 electrons.

Saturation charge of output amplifier B:
  a. 4.800.000 electrons.

When the sensor is operated in the horizontal direction (TDI direction, Time Delay Integration), with 3×3 binning the read-out register can hold a 100% signal of 3 successive pixels (3×600K=1800K, K=Kilo=1000). With 4×4 binning, four horizontal pixels charged to 75% of their capacity (1800K/4/600*100) can be summed without overflow. Overflow may mean that e.g. an electronic component, such as a capacitance, has no capacity left for additional charges. In overflow in the image area, an extra electron charge may move in the horizontal direction, and in overflow in the output register it may move in the vertical direction.

In the vertical direction (read-out direction), the situation is as follows. With 2×2 binning, 2 pixels having a 50-% charge can be summed to one output A and 3 pixels with a 100% charge to a second output B without overflow. With 3×3 binning, 3 pixels having 44% of the charge can be summed to output A and 3 pixels having 88% of the charge to output B without overflow. With 4×4 binning, 4 pixels with a 25% charge can be summed to output A and 4 pixels with a 50-% charge can be summed to output B without overflow.

From this it can be seen that even the less sensitive output B is unable to handle the signal coming from the image area without getting saturated if the signal exceeds 25% of the charge capacity of the physical pixel when output A is used. This situation can be corrected by applying the invention and its preferred embodiments.

Figures 1, 2:
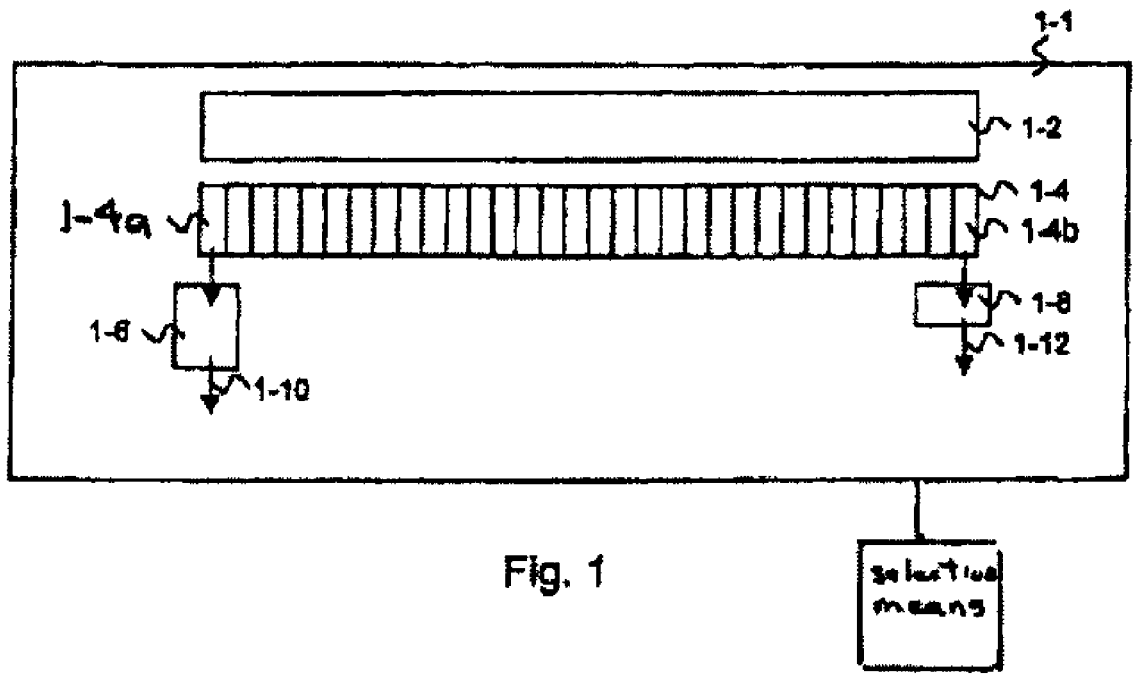
FIG. 1 presents a device for increasing the dynamics according to a preferred embodiment.
FIG. 2 illustrates the structure of image data.

FIG. 1 presents a CCD sensor for expanding dynamics according to a preferred embodiment. Here, reference number 1-1 represents an entire CCD sensor module, a detector. The active area of the detector, which comprises charge-receiving pixels, is indicated by a reference number 1-2. This image-forming surface in question may be a substantially even structure of any shape.

For example, the image information of a two-dimensional CCD sensor can be read out using a read-out register 1-4 placed on at least one edge, the register being functionally connected with said active area. Into this register it is possible to load e.g. one pixel column at a time. The pixels in the pixel column may be combined with each other, i.e. binned. The senor also comprises means for transferring the charges to an output 1-4a, 1-4b of the read-out register 1-4. After the transfer, the register can be read e.g. serially by transferring the charge one pixel at a time, binned or without binning, into a charge well 1-6, 1-8 of the output amplifier, from where it can be further transferred out 1-10, 1-12 from the CCD sensor 1-1.

Thus, by using suitable arrangements, the charges can be transferred in the register in a desired direction, in the direction of a lower-capacity output well or in the direction of a higher-capacity output well. The choice of the output well to be used during imaging is optimized dynamically during imaging, so that the output well to be used and/or the size of the binning are/is selected e.g. by electronics, a suitable selection program or a combination of these.

An output well 1-6, 1-8 of the output amplifier may be located at either end of the register 1-4, or alternatively two or more wells and/or amplifiers may be placed at one end of the register or at least one well may be placed at each end of the register. According to the invention and a preferred embodiment of it, the read-out register has at each end of it at least one charge well, read-out well 1-6, 1-8 and amplifier functionally connected with it.

An amplifier and/or buffer and/or buffer amplifier may be functionally connected with the well.

The dual amplifiers in question may be designed for different uses. For example, one of the amplifiers can be optimized for a so-called slow-scan mode, in which case the noise can be optimized to be as small as possible at the cost of speed. The other amplifier may be optimized for a so-called high-speed mode, in which case the reading rate can be optimized to be as fast as possible, but at the cost of noise.

However, in both traditional amplifiers, the output amplifier's charge wells have had the same capacity. According to the invention and its preferred embodiments, at least two output wells having different capacities are produced. The capacities preferably differ from each other substantially e.g. so that the larger output well has a capacity about twice that of the smaller output well. Other ratios can be used as well. If the number of wells is greater than two, then the capacities of at least two wells may differ from each other.

Thus, the invention and its preferred embodiments are based on the use of at least two charge wells of different capacities and on the possibility of dynamically selecting during read-out the output well to be used. This selection can be made depending on the signal, on the basis of signal data, e.g. image signal.

As compared to a situation where only one output amplifier is used or, on the other hand, where two output amplifiers having the same capacities are used, this arrangement provides the advantage of allowing saturation of the internal shift wells and read-out wells (not of the image area) of the CCD sensor to be avoided. In addition, by applying the invention and its preferred embodiments, the A/D converter can be prevented from being saturated. Both situations are very likely to occur when the charges of pixels are being combined, i.e. binned, with pixels larger than 2×2.

Figure 6:
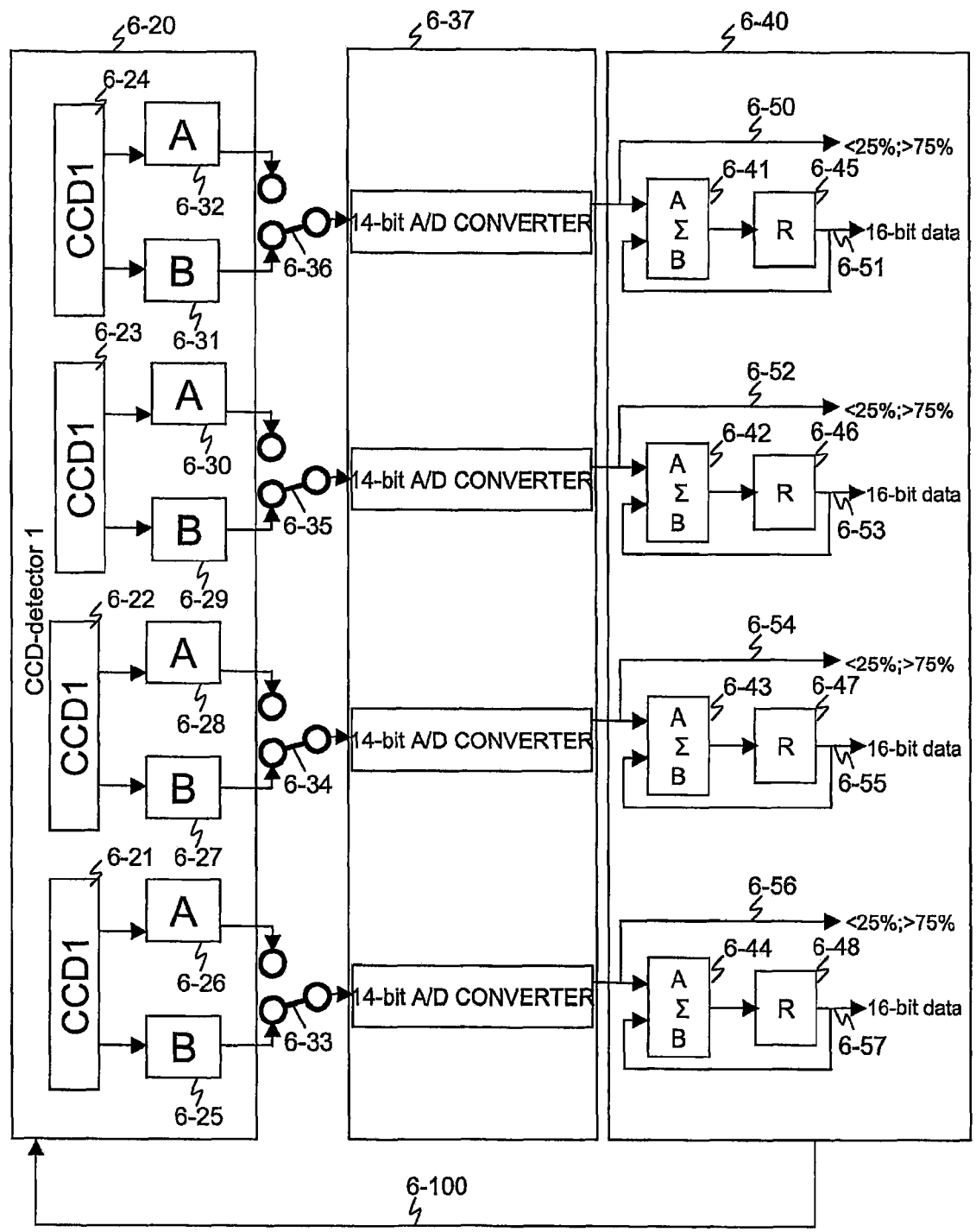
FIG. 6 presents a four-chip CCD sensor and its control blocks.

FIG. 2 illustrates the structure of an image data set. In the figure, the lowest 14 data bits (AD0-AD13: FIG. 6: 6-51, 6-53, 6-55, 6-57) may come from the 16-bit summer (FIG. 6: 6-41, 6-42, 6-43, 6-44) of the image data processing module of the FPGA device (FIG. 6: 6-40) (FPGA, Field Programmable Gate Array) and from the register (6-45, 6-46, 6-47, 6-48) which can store the intermediate sums. This summer can be reset before the sampling of each pixel, and the 14-bit result obtained from the A/D converter can be added once to this summer. It is also possible to add the value +1 to the sum to ensure that the result is always greater than 0. This result is a 14-bit number and the highest 2 bits (ADD0 and ADD1) are zeros.

In a certain case, the values of four successive A/D converters are added to this summer, whereby the result approaches the 16-bit maximum. If one additionally considers the fact that each chip of the CCD sensor may have two outputs (Output A and Output B, one of which may give a double signal with the same radiation), one is able to note that the overall dynamics of the system is 17 bits, i.e. 131 072 greyness levels (16384×4×2).

One CCD sensor (FIG. 6: 6-20) may consist of one or more, e.g. four chips (FIG. 6: 6-21, 6-22, 6-23, 6-24) seamlessly connected one after the other. A separate clock signal can be applied to each chip. In Ceph operation, two identical CCD sensors are used. Each chip has two outputs (FIG. 6: 6-25 . . . 6-32). One of these may be a more sensitive so-called high-sensitivity output, i.e. A output, and the other one may be a less sensitive so-called high-capacity output, i.e. B output. Thus, one CCD sensor may have a total of 8 digitizing outputs, of which e.g. only four outputs are used simultaneously. In practice, the ratio of the capacities of the A and B outputs is very precisely ½, i.e. the signal of the B output is equal to half the signal of the A output with the same amount of radiation.

If more than one chip is used, each one of the different chips can handle data obtained from a given part of the patient and/or function in a different mode, and each chip can be controlled individually or separately.

The output in use can be selected (switches 6-33 . . . 6-36 in FIG. 6) e.g. manually via a control register. Alternatively, the AGC function or a test function may decide about the output. All 8 outputs can be digitized by A/D converters, the number of which may be e.g. three. Each A/D converter may contain a 3-input multiplexer, i.e. selector, so the total number of channels to be digitized in this case is 9. An extra tenth channel is in test use, which can be applied to measure the noise of the electronics and the A/D conversion.

FIG. 6 presents a situation where the selecting element 6-33 . . . 6-36 after the output wells 6-25 . . . 6-32 routes one of the wells to one A/D converter 6-37. Alternatively, it is possible to perform an A/D conversion on the outputs of both wells and only then to have the selection element make a choice as to the one of the wells whose digitized signal is to be used. The selection element may also form part of the A/D converter and it may be e.g. an analog or digital switch. FIG. 6 also illustrates a possible solution 6-100 for bringing clock signals and/or control signals from the FPGA element 6-40 to the CCD sensor 6-20.

AGC function refers to automatic control of level or gain. However, it does not refer to the gain of the programmably variable PGA amplifiers (Programmable Gate Array) within the A/D converters, the gain of which amplifiers can be adjusted e.g. in the range 1 . . . 6. This gain can be adjusted separately for each CCD chip, and the adjustment is used primarily for the optimization of basic sensitivity in accordance with the imaging conditions (Pan/Ceph).

The AGC method can be utilized in a camera e.g. in the following two ways. Either one of the output amplifiers A or B of each CCD sensor can be used as far as applicable. Since the B amplifier has a signal handling capacity about twice that of the A amplifier, virtually one additional bit is obtained in the A/D conversion. Alternatively, it is also possible to use binning performed outside the CCD sensor. However, this is only possible when binning done in the direction of the read-out register.

If in cases of high binning, e.g. 4×4 binning, the B output amplifier is getting saturated, then it is possible to shift to a lower binning within the CCD sensor, e.g. to 4×2 binning. The pixel values can now be sampled twice by the A/D converter, and the summing can be performed e.g. within the FPGA device in an arithmetic unit. Multiple summing of the offsets caused by the electronics can be compensated for by computer software. This external summing may even be in the form of 4×1 binning and 4 summing operations.

To reduce the binning, instead of summing e.g. four charges, it is possible to combine only 2 pixels in the charge well, digitize the pixels, take the next two pixels, digitize the pixels and only then sum the digitized results digitally.

In the above-described manner, the overall dynamics can be increased to 17 bits, of which 14 bits are obtained from the A/D conversion, 1 bit from the output of the A or B amplifier and 2 bits from the external summing, which, as stated above, can be performed 4 times.

Figure 3:
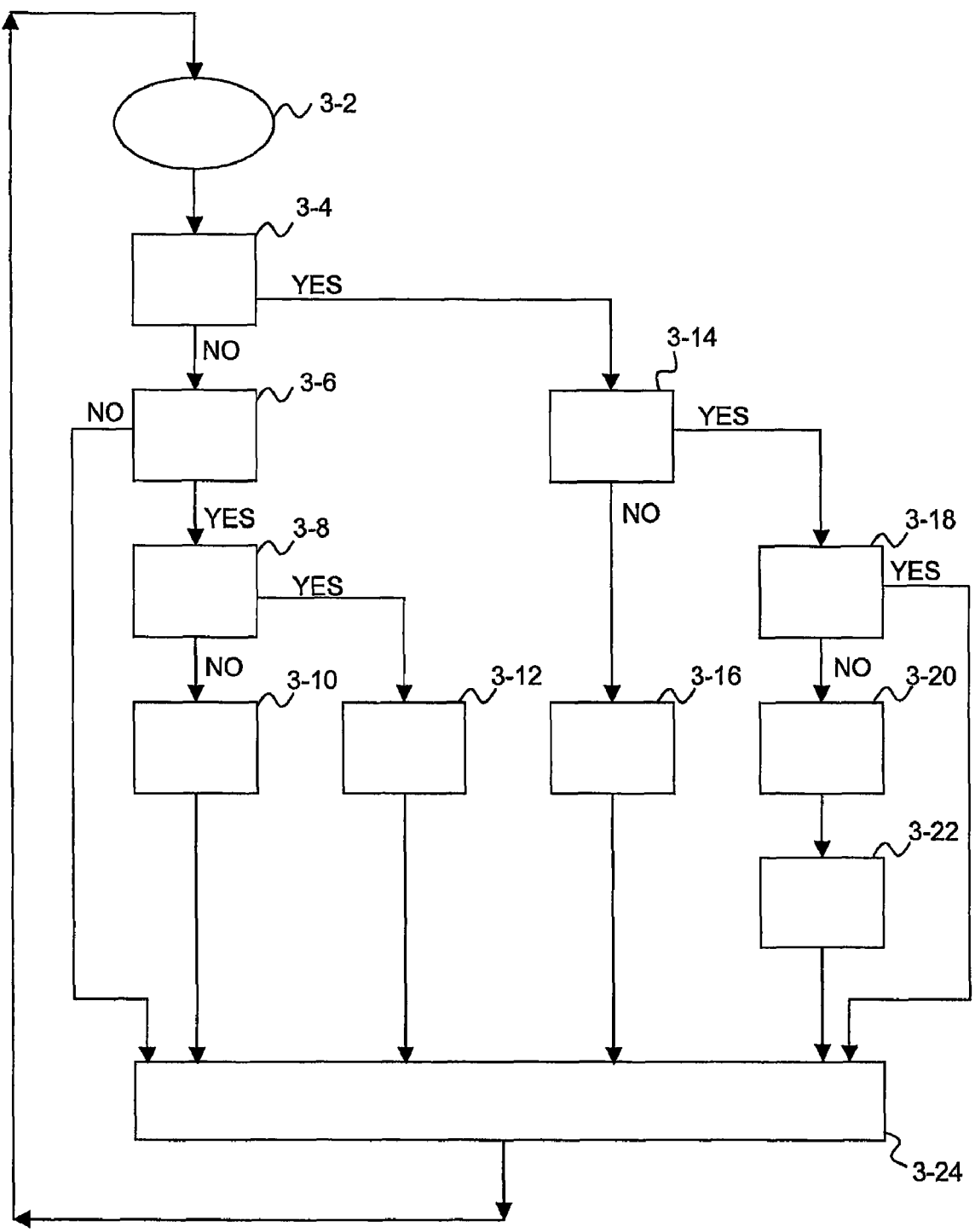
FIG. 3 presents by way of example a method for performing imaging and a logic for controlling the AGC function of an FPGA device during imaging.

FIG. 3 illustrates by way of example a method for performing imaging and presents the control logic controlling the automatic gain control (AGC) of the FPGA device during imaging. Imaging is normally started with a selected initial value, default binning. At the beginning, output A of each CCD sensor chip can be used. As the read-out register of each chip can be controlled individually, it is possible to choose on a chip-specific basis the direction in which the charge is to be shifted. As stated, the charge can be shifted either in the direction of output A (1-8: FIG. 1) or in the direction of output B (1-6: FIG. 1).

The logic of the FPGA device can continuously monitor the A/D conversion signal of each chip separately. At stage 3-2, a new vertical column is read from the CCD sensor into memory. At stage 3-4, a check can be carried out to see whether even one of the currently used A/D-converted CCD-sensor outputs (FIG. 6: 6-50, 6-52, 6-54, 6-56) produced a signal exceeding e.g. 75% from the A/D converter. (Information regarding the signal size can be transferred to an inference block and e.g. to a status machine (FIG. 6: 6-50, 6-52, 6-54, 6-56). Thus, if the signal or a part of it exceeds a predefined value, e.g. ¾ of the range of the A/D converter, then it is possible to shift to using the less sensitive output, output B, in those chips that meet this condition. If all the outputs are below the first threshold value, then a check can be made at stage 3-6 to determine whether all the currently used CCD-sensor outputs produced a signal below a second predefined threshold value, e.g. 25%, from the A/D converter. If all the outputs are below the second threshold value, then a check can be made at stage 3-8 to establish whether the smallest register-direction binning outside the CCD sensor has already been reached. If the smallest external binning has not yet been reached, then the procedure can move on to stage 3-10, where, on the next vertical column, it is possible to shift to an external binning size reduced by one step. On the other hand, if the smallest external binning has already been reached, then at stage 3-12, on the next vertical column, for those B-outputs of the CCD sensor which remain below the value, it is possible to shift to using output A. In other words, if the signal correspondingly remains e.g. entirely below a certain predefined second value, e.g. ¼ of the range of the A/D converter, then it is possible to shift to using the more sensitive output, output A, in those chips that meet this condition.

If at stage 3-4 at least one output exceeds 75% of the signal from the A/D converter, then the procedure can go on to stage 3-14. Here a check can be made to see whether any one of the outputs having produced a signal exceeding 75% is a B output. If not, then for the exceeding A outputs of the sensor it is possible to shift to using the B output on the next vertical column at stage 3-16.

If the signal still exceeds ¾ of the range of the A/D converter in any one of the A/D converters of the CCD sensor chips although a shift to using output B has been made, i.e. where the B output is digitized, then at stage 3-18 a check can be made to determine whether the maximum register-direction external binning has already been reached. If the register-direction external maximum binning has not yet been reached, then at stage 3-20 on the next vertical column it is possible to shift to using a register-direction arithmetic external binning size increased by one step e.g. for all chips. If necessary, the binning can be changed gradually from 4×4 level to 1×4 level and back to 4×4 level. This reduction of binning is not externally visible in the image data because, in addition to the binning done inside the sensor, binning is also performed after the A/D conversion, in other words, several A/D conversions per pixel can be performed. The result is still the same, because this is taken into account in the compensation of dark current. Dark current may refer to the leakage current caused by non-idealities of silicon, as a result of which electrons leak into pixels, producing a base signal. The signal may be doubled as the temperature always rises about +7° C. The dark current is not uniform but may have a different effect on different pixels.

The structure and timing of the FPGA device can be optimized even in regard of this property. At stage 3-22, the use of the A output can be resumed for all CCD sensors whose B output has a level below the second threshold value, e.g. below 25%. If external maximum binning in the register-direction has already been reached, then the procedure can move on from stage 3-18 to stage 3-24. Likewise, after stages 3-10, 3-12, 3-16 and 3-22 the procedure can move on to stage 3-24, to await the digitization of the next vertical column.

Thus, if the AGC function has been activated, in the gain control automatics the camera head can independently make its conclusions regarding binning and the A/B outputs to be used, in accordance with predefined conditions. The logic of the FPGA device can be so constructed that it comprises a hysteresis to prevent jumping from one output to another. The image data being produced can be marked by the camera head to allow the computer software to carry out corresponding actions required in the processing of image data regardless of e.g. how the virtual pixels have been produced.

According to the invention and its preferred embodiments, when at least two different output wells having different capacities are used, the status diagram in FIG. 3 can be presented in the following form. When the lower-capacity output well is being used, a check is made to determine whether the signal or a part of it exceeds the first predefined value, e.g. value 75%. If this is the case, then a shift to using the output well of higher capacity is made. Again, when the higher-capacity output well is being used, a check is made to see whether the signal or a part of it remains below the second predefined value, e.g. value 25%. If this is the case, then a shift to using the lower-capacity output well is made.

It is also possible to extend the status diagram so that it comprises more than two output wells. It is then possible to shift from using a smaller output well to using a larger output well and further the next output well, e.g. a still larger output well. Correspondingly, it is possible to shift from using a larger output well to using a smaller output well and further the next output well, e.g. a still smaller output well. It is further possible to use, instead of at least two output wells of different capacities, an output well having an adjustable capacity.

As described above, in the start-up it is possible to set out in a predetermined manner with all chips of the CCD sensor. The starting situation may be fixed and always the same: output A for all CCD sensors, normal selected CCD sensor pixel binning, no external binning outside the CCD sensor. Thus, imaging can always be started from maximum sensitivity with the selected pixel size. External binning outside the CCD sensor to be implemented by summing can also be defined separately, if it is not desired that the AGC function automatically shifts to the lowest possible sensitivity. It is also to be taken into account that after the ENABLE signal has been activated e.g. internally, the FPGA device executes a calibration sequence in which both the A direction and the B direction can be read alternately forwards or backwards. During this calibration, the AGC function can be automatically disabled, and, when selected, it can only be activated after the calibration sequence.

As described above, when automatically moving in the less sensitive direction, on the next column it is possible, if allowed, to shift to using the B output of the CCD sensor chip. This can be used if, when the A output is being used, there are e.g. n A/D conversions exceeding the 75% level. This consideration can be implemented individually for all chips of four or eight pieces. The number n can be selected within the range of 1 . . . 16. The default can be assumed to be 1. The actual number to be used depends on how many defective rows producing too large a signal there are at the most in one and the same chip.

If it is possible or allowed, on the next column the procedure can shift to using a smaller register-direction binning internally within the entire sensor if, of the A/D conversions of the B output of any one of the chips of the CCD sensor 1 . . . 16 pcs, still exceed 75%. At the same time, possible chip-specific shifts from output B to output A can be implemented, this allowing possible increases in sensitivity. In the shift from output A to output B, decreases in sensitivity can be disabled. In this situation, simultaneous AB sensitivity decreases can be prevented if at the same time a shift to external binning is made. Otherwise, the signal of these outputs may fall to one fourth instead of one half.

When a shift is made automatically in the more sensitive direction, on the next column it is possible to shift to using a larger register-direction internal binning within the CCD sensor, unless the largest possible binning is already being used, if a maximum of m pcs of the A/D conversions of the outputs of the chips using the B output exceed 25%. The number m can be selected in the range of 1 . . . 16 and the default value can be considered as being the value 1. The actual number to be used may depend on e.g. how many defective, saturated rows producing too large a signal there are at most in one and the same CCD chip.

In this case, in chip-specific shifts from output B to output A that may take place, increase in sensitivity can be disabled, and in shifts from output A to output B decrease in sensitivity can be enabled. In this situation, simultaneous AB sensitivity decreases can be disabled automatically if at the same time a shift is made to smaller external binning. Otherwise the signal of these outputs would be quadrupled instead of doubled.

If the A/D conversion of the output of any chip does not exceed 25% when the B output is being digitized, then on the next column a shift to using the A output of the chip can be made.

A corresponding procedure can be followed when the Ceph method is being used in a CCD sensor head containing two CCD sensor packages. The FPGA device of the CCD sensor (DIMAX2) is able to separately control the read-out direction of the register of a total of eight discrete chips and to collectively control the vertical binning of all the chips.

Arranging for the vertical binning to be differently sized for different chips of the CCD sensor is also possible, although it involves more complexity in both the hardware and software required.

When the gain is altered in the above-described manner, the system noise and X-ray quantum noise present in the signal may also be different in magnitude on different outputs (output A/output B) and/or with A/D binning. The noise may be reduced when binning is done using an A/D converter. If necessary, this can be taken into account in the software, where noise can be summed artificially onto those areas where it is smaller due to the binning method.

In some pixels, dark current can be reduced several times, depending on the binning method. This can be accomplished e.g. mathematically and via software. If necessary, dark current calibration and gain calibration can be performed for both the A output and the B output. The FPGA device allows measurement of the signals of both outputs.

However, it is to be noted that in the case of small binning sizes (2×2 or 1×1), the automatic gain control function is not of use.

Figures 4, 5:
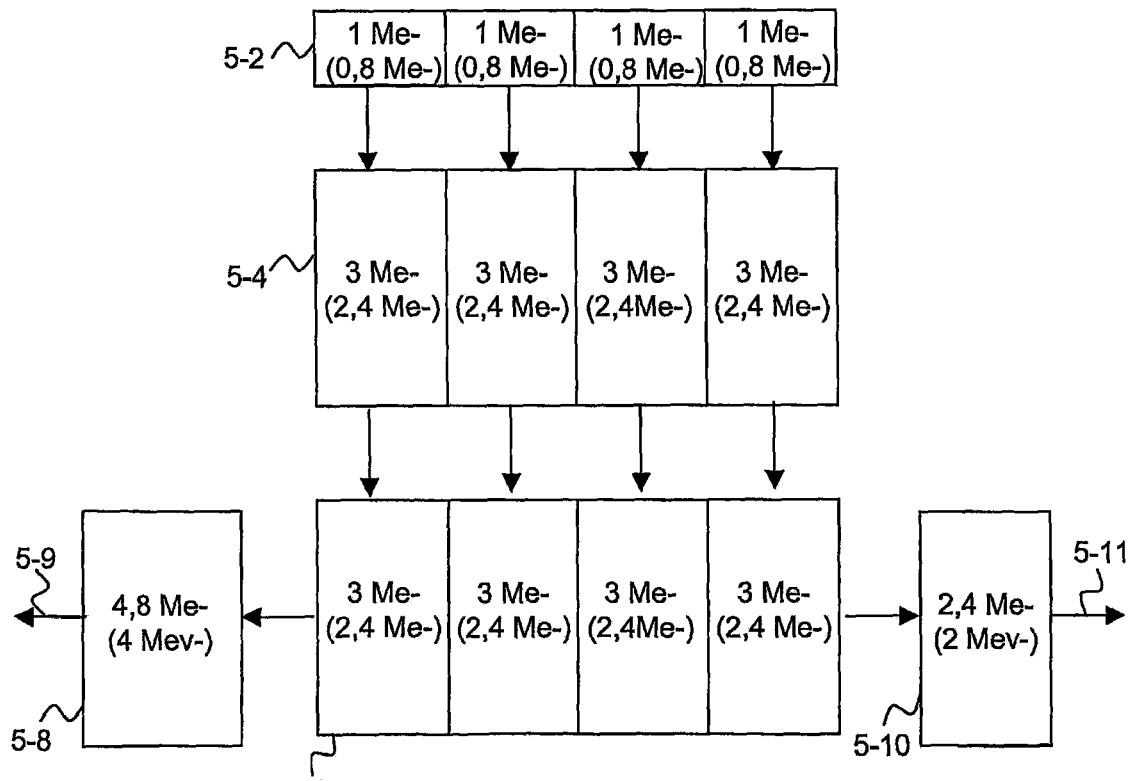
FIG. 4 presents a table showing the typical charge handling capacities of the CCD sensor used.
FIG. 5 represents by way of example a charge capacity distribution in all units capable of electron charge transfer.

FIG. 4 presents a table showing typical charge handling capacities of a CCD sensor used. In the figure, column 4-2 represents the capacity and column 4-4 represents the number of electrons. It can be seen from the table that, when the capacity of one pixel (33 μm×33 μm) is 1 million electrons, the capacity of the read-out register is 3 million electrons, the capacity of output amplifier A is 2.4 million electrons and the capacity of output amplifier B 4.8 million electrons. The guaranteed minimum capacities are at a level about 20% lower.

FIG. 5 presents by way of example a charge capacity distribution in units capable of electron charge transfer. Block 5-2 represents four pixels in the image area with a typical saturation, which is about 1 million charges, at a minimum 800000 charges. The saturation value of each pixel is about 0.8 . . . 1Me.

Each pixel in the image area can be combined with a pixel in the summing register. Block 5-4 represents four summing register pixels with a typical saturation value, about 3 million charges, and the value at its minimum, about 2.4 million charges. Thus, the saturation value of each pixel is about 2.4 . . . 3 million charges.

Each pixel in the summing register can in turn be combined with a read-out register. Block 5-6 represents the typical saturation and minimum values of four read-out registers, 3 million charges and 2.4 million charges, respectively. Block 5-8 represents a typical saturation value of output well B, about 4.8 million charges, and minimum value, about 4 million charges, respectively. The output signal 5-9 of output well B is typically about 3 volts, at a minimum about 2 volts. Block 2-10 again represents a typical saturation value of output well A, about 2.4 million charges, the minimum value of this amount of charge being 2 million charges. The output signal 2-11 of output well A is typically about 3 volts, at a minimum about 2 volts. In FIG. 2, the basic sensitivity is about 60 mV/mR with 3×3 binning. The pixel size is about 99 micrometers.

From the example in FIG. 5, it is possible to derive the situation in the horizontal direction. In this case, with 4×4 binning it is possible to bin 4 horizontal pixels from the image area, the image areas having a 75% degree of fullness (3000000/4=750000), without overflow occurring in the read-out register. With 3×3 and smaller binning sizes, pixels in the image area can be binned freely into the read-out register without overflow occurring in it.

However, it is to be noted that the output wells have to be designed to be sufficiently small to avoid a loss of sensitivity of the CCD device. The output voltage 5-9, 5-11 is then suitable for the A/D conversion, so that it is sufficient in respect of both signal-to-noise ratio and resolution. This may involve limitations, even when output wells of different capacities are used.

In the vertical direction, the read-out direction, the total signal level in the case of 4×4 binning is about 4×4×1 Me=16 Me (million electrons). This is about 6.6 times more than the capacity of output well A, and about 3.3 times more than the capacity of output well B. Thus, with this binning, the largest average charge to be handled, for the whole capacity of e.g. a 33-μm pixel before saturation of the output well, is about 15% of the value obtained when the A output is used and about 30% of the value obtained when the B output is used.

When 3×3 binning is used, the total signal level is about 3×3×1 Me=9 Me. This is about 3.75 times more than the capacity of output well A and about 1.875 times more than the capacity of output well B. Thus, with 3×3 binning, the largest average charge to be handled, for the whole capacity of e.g. a 33-μm pixel before saturation of the output well, is about 26.6% when the A output is used and about 13.3% when the B output is used.

When 2×2 binning is used, the total signal level is about 2×2×1 Me=4 Me. This is about 1.66 more than the capacity of output well A. However, output well B is large enough to hold this entire 4-Me capacity. Therefore, with this binning the largest average charge to be handled, for the whole capacity of e.g. a 33-μm pixel before saturation of the output well, is about 60% when the A output is used, but about 100% when the B output is used.

If no binning is done, the total signal level is about 1Me, i.e. the same as the level of the pixel. In this case, both the internal registers and the output wells can handle the signal without a risk of saturation.

From FIG. 5 it can be seen that the less sensitive B output is unable to handle the signal coming from the image area with 4×4 binning without being saturated if the signal exceeds about 30% of the charge storing capacity of the physical pixel. However, this problem can be solved by applying the invention and its preferred embodiments.

According to the invention and its preferred embodiments, the sensitivity and therefore the dynamics can thus be increased by several different methods. The dynamics can be increased e.g. by simply changing the binning. The binning can be changed by shifting to a higher or lower binning level. The binning can be changed several times and the binning can be changed e.g. externally outside the CCD sensor.

Instead of changing the binning, it is also possible to make a shift to using an output well of larger capacity. Thus, instead of using the A output, it is possible to make a shift to using the B output, which has a larger capacity. It is also possible to make a further shift to using another output well, e.g. a still larger output well.

As additional alternatives for increasing the dynamics, it is possible to first make a shift to using an output well of larger capacity and then additionally to change the binning, or it is possible to first change the binning and then additionally to make a shift to using an output well of larger capacity.

When the sensitivity, dynamics of the arrangement is to be changed, this can be done by changing the binning at least partially in response to a control signal. The control signal can be defined e.g. beforehand, before changing the binning. The control signal may also be based on a direct or indirect signal, which may be dependent on e.g. the amount of light seen by the CCD sensor. Alternatively, the control signal may be based on the signal read out from the CCD sensor. The control signal may also be based on some other signal.

The dynamics of the arrangement can be changed during imaging or before or after imaging. The binning can be changed e.g. between the image area and the shift register and/or between the shift register and the output register.

Moreover, the arrangement may comprise means for normalizing the image signal. In the normalization, the image can be processed in such a way that the image(s) subsequently looks/look like a visible picture/visible pictures, e.g. so that no changes occur in the gray scale. The normalizing means may comprise digital summing of the signals produced by pixels physically adjacent to each other on the sensor and/or correction of dark current, which may depend on the binning, and/or gain. The summing and/or correction in question can be implemented partly or completely e.g. electronically and/or via software.

The aim of the invention and its preferred embodiments is thus to expand the dynamic range of the CCD sensor e.g. by external means to be as wide as possible. According to the invention and its preferred embodiments, the amplifiers can be optimized in respect of noise and speed e.g. for real-time TDI read-out of an X-ray image when the capacities of the charge wells are different. This procedure allows the dynamic range handled by the CCD sensor to be e.g. doubled or quadrupled when larger binning sizes, e.g. over 2×2 binning, are used.

In addition, in the arrangement the signals of both output amplifiers can be digitized either simultaneously or alternately. The choice of which one of the two output amplifier signals is to be used depends on the signal itself. With a suitable arrangement, it is possible in a CCD sensor, which may consist of a plurality of CCD sensor chips, to handle the signal of each CCD sensor chip separately and likewise to decide separately which one of the amplifiers is to be used in each chip. This decision can be made column for column, and thus the signal level can be monitored dynamically and maximized over the entire image area. The automatic selection of register read-out direction and therefore selection of the amplifier can be made e.g. independently, by means of the controlling FPGA device. The information as to which amplifier has been used can be transmitted in the image data separately line by line and also separately for each CCD so that the calibration program will be able to take this into account in the processing of image data. Image data can be shifted at 16 bits/pixel even in the case of a 14-bit conversion.

If e.g. a 14-bit A/D conversion is used, it can easily be increased virtually to a 15-bit conversion (doubling of dynamics, if the capacity ratio of the wells of the output amplifiers is 2:1) still using the same A/D conversion.

In a CCD sensor camera it is thus possible to select whether output A or output B is to be used. This selection can be made e.g. manually or automatically using an AGC device separately for each chip, e.g. for all eight chips. Yet both register-direction binning and horizontal binning are always the same for all chips. If this procedure were not followed, the image data produced to the computer would contain pixels of different sizes. Even if the camera head of the camera shifts to using a smaller binning size internally in the CCD sensor, the virtual pixels remain the same size. A missing binning within the sensor can be replaced invisibly by A/D binning.

In other words, the binning is common to all the chips, whereas the A/B direction can be selected individually either manually or automatically with the help of the AGC device separately for each chip. It is also possible to differentiate the AD binning on a chip-specific basis.

In a preferred embodiment, some of the chips may shift back to using the more sensitive A output, whereas the other chips may produce a signal so large that both the B output and external binning outside the CCD device are required. In other words, if the B output of any one of the chips produces too large a signal so that a shift has to be made to using a smaller internal binning, the other chips can freely move back in the A-direction if the signal in them falls too low. The control logic for the A/B outputs, i.e. for a total of e.g. 8 chips, may be separate, but the FPGA device may have a common binning logic within it.

According to the invention and its preferred embodiments, the dynamics of the A/D converter of the CCD sensor (the DIMAX2 device has a 14-bit A/D converter=16384 discrete levels) can be expanded e.g. to be eight times higher (17 bits=131072 discrete levels). This expansion takes place in the CCD sensor head (DIMAX2) automatically and depending on the image signal. The dynamics can be doubled when a shift is made to using the output well of larger capacity instead of the smaller output well. The dynamics can be further increased fourfold when a shift is made to using 4×2 binning instead of 4×4 binning and after this to using 4×1 binning. In all, by this way the dynamics can thus be increased by the aforementioned amount, in other words, the dynamics can be octupled.

The sensor is able to send the image data in a genuine 17-bit format to the computer. Moreover, it is to be noted that the image data can be compressed on the computer to a 12-bit format (in future to a 16-bit format) as soon as the minimum and maximum intensities are known. Regardless of this, it is preferable to image the object itself using maximum dynamics. Gamma correction can be performed simultaneously while the image data is being converted to 12-bit format, so that maximal dynamics can be preserved in the final image.

Pixel binning can also be performed alternately using binning where two pixels are binned in the register direction of the CCD sensor and sampled and after this one further pixel is digitized without binning and this result is added to the previous binned pixel. This binning method can be used if the selected original binning in the register direction is about three-fold and if it is necessary to move in the less sensitive direction while the AGC device is in an activated state.

During this 3× binning there may occur errors of symmetry when a shift is made to external summing binning, if 2 pixels binned within the CCD sensor are summed first and then additionally one separate CCD device. However, even this situation can be taken into account by software.

The AGC function is only dependent on register-direction binning. Binning in the horizontal direction, in the TDI direction, is of no consequence. Horizontal binning may be different than vertical binning. In this case, however, the pixels produced are not the size of an equilateral square.

The invention and its preferred embodiments also provide means for ensuring that that the CCD sensor has separate outputs for at least two capacities.

An arrangement according to the invention and its preferred embodiments can be integrated on a single CCD chip using one or more microcircuits. It is also possible to additionally integrate e.g. PGA amplifiers in the CCD pre-stages of the device. The gain of these amplifiers is adjustable e.g. in the range of x1 . . . x6 in 64 steps (at present x1).

By applying the invention and its preferred embodiments and adjusting the gain to a suitable value relative to the signal level (Ceph/Pan), an optimal result can be achieved in respect of both noise and dynamics. Since the signal level particularly in Ceph images is very low, extra gain can be utilized to reduce subsequent image processing artefacts and system noise. Moreover, the device according to the invention and its preferred embodiments still prevents saturation. Also, for instance, it is possible in the same skull imaging to have the soft tissue areas included in the image e.g. via software (soft-tissue filter).

A CCD sensor according to the invention and its preferred embodiments produces 16-bit image data, pixels, with very high dynamics, the structure of such image data being illustrated by way of example in FIG. 2. As shown, 2 bytes are needed to represent the grayness level of a pixel. The first byte occurring in the data flow contains the lower 8 bits (AD0-AD7) while the byte coming next contains the upper 8 bits (AD8-ADD1). The A/D conversion in itself is a 14-bit conversion. This bit count of the A/D conversion is justifiable by the fact that the system's own noise is very low.

Thus, the CCD sensor according to the invention and its preferred embodiments solves the problems of limited dynamic range and slow recovery from an saturated situation. By using a 14-bit conversion and keeping the system noise at a low level, an ideal situation is achieved where one step of the A/D converter corresponds to the noise level of the output amplifier of the CCD sensor. The signal-to-noise ratio of the final image is determined by the quantum noise of the X-ray beam. In a normal imaging situation, the two topmost bits (ADD1 and ADD0) of the 16-bit pixel value may be zeros.

However, exceptions occur in two situations. The function of the automatic gain control according to the invention AGC and its preferred embodiments may, in the case of a large amount of radiation, have transferred binning of the CCD sensor pixels into a form in which register-direction binning is done by binning fewer pixels together. For the situation to remain the same, sampled values of successive pixels can be summed within the FPGA device. Thus, x4 binning may be changed e.g. to the form x2+x2 or, in the worst case, to the form x1+x1+x1+x1. In this situation, the value of the 16-bit pixel approaches the value 0xFFD when four 14-bit values are summed together. However, the AGC device can take care of all this independently. In this summing situation, an amount of dark current offset corresponding to the number of summing operations can be subtracted from the signal.

It is obvious to a person skilled in the art that, with the development of technology, the basic concept of the invention can be implemented in many different ways. Thus, the invention and its preferred embodiments are not limited to the examples described above but may vary within the scope of the claims. Within the framework of the inventive concept, the sensitivity can be adjusted in other ways as well.

The invention claimed is:

1. A CCD sensor arrangement for use in radiographic imaging, comprising a CCD sensor, which comprises:
    a detector having an active area comprising pixels that receive charges;
    a read-out register functionally connected with the active area;
    means for transferring charges from the active area to the read-out register,
    at least two read-out wells functionally connected with the read-out register, said at least two read-out wells having different capacities,
    means for transferring charges from the read-out register to the at least two read-out wells,
    means arranged in the CCD sensor or in functional connection with the CCD sensor for measuring the signal generated by the charges read out or being read out from said at least two wells, and
    selection means for deciding during read-out of an individual image from said active area of the CCD sensor, at least partly on the basis of the measured signal representing attenuation of X-ray radiation having penetrated an object being radiographed, whether a read-out well to be used is to be changed.

2. The CCD sensor arrangement according claim 1, including means to perform an A/D conversion to the signal read-out from the CCD sensor, and wherein said selection means is adapted to select, after the A/D conversion, the read-out well to be used.

3. The CCD sensor arrangement according to claim 1, wherein in the CCD sensor, or in functional connection with the CCD sensor, means is arranged, the means is adapted to check whether at least part of the measured signal exceeds or is below a predefined threshold value; and if the at least part of the measured signal exceeds or is below the predetermined threshold value, to give a signal that the read-out well to be used is to be changed to a read-out well of different capacity.

4. The CCD sensor arrangement according to claim 1, including two read-out wells which are located at opposite ends of the read-out register or at one end of the read-out register.

5. The CCD sensor arrangement according to claim 1, which includes two read-out wells (1-6, 1-8) and wherein the capacity of the second read-out well is equal to about twice the capacity of the first read-out well.

6. The CCD sensor arrangement according to claim 1, which comprises a register arranged between and in functional connection with the active area of the detector and the read-out register, where to charges of pixels of the active area may be transferred, for summing the charges, before transfer of the charges into the read-out register.

7. The CCD sensor arrangement according to claim 1, including means arranged in functional connection with said at least two read-out wells adapted to check whether the signal value read-out from a read-out well exceeds a predefined threshold value; and if the signal value exceeds the predefined threshold value, to additionally check whether a read-out well of larger capacity is being used, and if a read-out well of larger capacity is not being used, to make a shift to using a read-out well of larger capacity instead of a read-out well of smaller capacity, and, correspondingly, in case the signal value read-out from a read-out well is below the predefined threshold value, to additionally check whether a read-out well of lower capacity is being used, and if a read-out well of lower capacity is not being used, to make a shift to using a read-out well of larger capacity.

8. The CCD sensor arrangement according to claim 1, including an A/D converter arranged in functional connection with said read-out register and means adapted to check whether an A/D conversion value exceeds a predefined threshold value;
    and if the A/D conversion value exceeds the predefined threshold value, to additionally check whether a read-out well of larger capacity is being used, and if a read-out well of larger capacity is not being used, to make a shift to using a read-out well of larger capacity instead of a read-out well of smaller capacity, and correspondingly, to make the opposite shift in case the A/D conversion value is below the predefined threshold value.

9. The CCD sensor arrangement according to claim 1, wherein said selection means is arranged to change the read-out well only after all the charges having been transferred, at a given time, from the active area to the read-out register at a given time have been read out.

10. The CCD sensor arrangement according to claim 1, which is arranged to be used in a TDI mode in accordance with a scanning X-ray irradiation of an object to be imaged and wherein said decision whether a read-out well to be used is to be changed is arranged to be made during said scanning X-ray irradiation.

11. The CCD sensor arrangement according to claim 1, wherein in the CCD sensor or in a functional connection with the CCD sensor, means is arranged for measuring the signal generated by the charges read out from a read-out well as well as means for changing binning of charges within the CCD sensor while read-out of information detected by the CCD sensor takes place, at least partly in response to a control signal being based at least partly on said measured signal.

12. The CCD sensor arrangement according to claim 1, including means for checking, in case a signal value read-out from the CCD sensor exceeds a predefined threshold value and a read-out well of larger capacity is being used and whether minimum binning upon transfer of charges within the CCD sensor is being used and if not, to shift to using a smaller binning before or during the subsequent read-out of the read-out register.

13. A read-out arrangement for reading a CCD sensor, said CCD sensor comprising:
- a detector having an active area comprising pixels that receive charges;
- a read-out register functionally connected with the active area;
- means for transferring charges from the active area to the read-out register;
- at least one read-out well functionally connected with the read-out register; and
- means for transferring charges from the read-out register to the at least one read-out well, and
- means for changing binning of charges at least partly according to a control signal during transfer of charges from pixels of said active area to the at least one read-out well, at least partly in response to the control signal, whereby in the CCD sensor or in a functional connection with the CCD sensor, means is arranged for measuring the signal generated by the charges read out from the at least one read-out well as well as selection means for deciding, at least partly on the basis of the measured signal, whether the binning is to be changed.

14. The arrangement according to claim 13, wherein the means for changing the binning of charges operates upon transfer of the charges from said active area of the detector to the read-out register and/or upon transfer of the charges from the read-out register to the at least one read-out well.

15. The arrangement according to claim 13, comprising means for normalizing an image signal, the normalizing means comprising means for digital summing of the signals produced by pixels located physically adjacent to each other on the CCD sensor.

16. The arrangement according to claim 15, wherein the normalizing means comprise means for correction of dark current and/or gain and/or electronics offset being dependent on the binning.

17. The arrangement according to claim 13, whereto means are arranged to implement binning partly electronically and partly by software.

18. The arrangement according to claim 13, including an A/D converter arranged in functional connection with said at least one read-out well and means for checking if an A/D conversion value exceeds a predefined threshold value and if the A/D conversion value is above said predefined threshold value, to additionally check whether the minimum binning upon transfer of charges within the CCD sensor is being used and if not, to shift to using a smaller binning before or during the subsequent read-out of the read-out register, and in case the A/D conversion value is below a predefined threshold value, to do the opposite.

19. A method for use in radiographic imaging for expanding dynamics of a CCD sensor, wherein at least two read-out wells having different capacities are arranged in functional connection with a read-out register of the CCD sensor, which method comprises the steps of:
- receiving charges in an active area of the CCD sensor comprising pixels in at least one vertical line;
- transferring charges from the at least one vertical line of pixels to the read-out register;
- transferring the charges from the read-out register to a read-out well,
- measuring the signal generated by the charges read out via said read-out well; and
- deciding, during read-out of an individual image detected by the CCD sensor, at least partly on the basis of the measured signal representing attenuation of X-ray radiation having penetrated an object being radiographed, whether capacity of the read-out well is to be changed.

20. The method according to claim 19, wherein an A/D conversion is performed on the signal of a read-out well and after the A/D conversion, the read-out well through which the signal is to be read is selected based on an A/D conversion value.

21. The method according to claim 19, wherein a pixel line or a number of pixels is read out and a check is made based on a signal based on charges of at least a part of said pixels whether the signal exceeds or is below a predefined threshold value; and if the signal exceeds or is below a predefined threshold value, a shift is made to using in the subsequent read-out of the read-out register a read-out well of larger or smaller capacity, accordingly.

22. The method according to claim 21, wherein the predefined threshold values are determined as a function of saturation level of the read-out well and are preferably arranged to be around 75% and 25% of the saturation level of the read-out well.

23. The method according to claim 19, wherein binning of charges within the CCD sensor is changed while read-out of information detected by the CCD sensor takes place, at least partly in response to a control signal being based at least partly on said measured signal.

24. The method according to claim 19, wherein the signal level of the signal read out from the CCD sensor is measured, and if the signal level exceeds a predefined threshold value, then the read-out of charges from the CCD sensor is adjusted in such manner that, before the charges in the read-out well are read out, the number of charge transfers to the read-out well is decreased, and if the signal level is below the predefined threshold value, the number of charge transfers to the read-out well is increased.

25. The method according to claim 19, wherein the signal level of the signal read out from the CCD sensor is measured, and if the signal level exceeds a predefined threshold value, then a binning in the direction of transfer of charges from a vertical line of pixels to a next vertical line of pixels is decreased, and if the signal level is below the predefined threshold value, the binning in said direction of transfer of charges is increased.

26. A method for use in radiographic imaging for expanding dynamics of a CCD sensor, wherein at least one read-out well is arranged in functional connection with a read-out register of the CCD sensor, the method comprising the steps of:
- receiving charges in an active area of the CCD sensor comprising pixels in at least one vertical line;
- transferring the charges from the at least one vertical line of pixels to the read-out register;

transferring the charges from the read-out register to a read-out well;

measuring the signal generated by the charges read out via said read-out well; and deciding, during read-out of an individual image detected by the CCD sensor, at least partly on the basis of the measured signal representing attenuation of X-ray radiation having penetrated an object being radiographed, whether capacity of the read-out well to be used is to be changed.

27. Method for expanding the dynamics of a CCD image sensor in connection with radiographic imaging, comprising the steps of:

receiving charges in an active area of the CCD image sensor comprising pixels;

transferring the charges of said pixels to a read-out register;

transferring the charges from the read-out register to at least one read-out well, and changing the dynamics of the CCD image sensor by changing the binning of charges during read-out of information detected by the pixels of the active area of the CCD sensor, wherein the signal level of the signal read out from the CCD image sensor is measured, and if the signal level exceeds a predefined threshold value, then the read-out of charges from the CCD image sensor is adjusted in such manner that, before the charges in the read-out well are read out, the number of charge transfers to the read-out well is decreased, and if the signal level is below the predefined threshold value, the number of charge transfers to the read-out well is increased, or wherein the signal level of the signal read out from the CCD image sensor is measured, and if the signal level exceeds a predefined threshold value, then the binning in the direction of transfer of charges from a vertical line of pixels to a next vertical line of pixels is decreased, and if the signal level is below the predefined threshold value, the binning in said direction of transfer of charges is increased.

28. The method according to claim 24, in which the CCD image sensor is used in a TDI mode in accordance with a scanning X-ray irradiation of the object to be imaged and wherein said changing of binning is made during said scanning X-ray irradiation.

* * * * *